United States Patent [19]

Kim

[11] Patent Number: 5,796,794
[45] Date of Patent: Aug. 18, 1998

[54] METHOD AND APPARATUS FOR SERIAL-TO-PARALLEL CONVERSION OF DATA BASED ON SYNC RECOVERY

[75] Inventor: Byeong-soo Kim, Kwachun, Rep. of Korea

[73] Assignee: Samsung Electronics Co., Ltd., Kyungki-do, Rep. of Korea

[21] Appl. No.: 606,761

[22] Filed: Feb. 27, 1996

[30] Foreign Application Priority Data

Feb. 27, 1995 [KR] Rep. of Korea .................. 95-3884

[51] Int. Cl.⁶ .................................................. H04L 7/00
[52] U.S. Cl. .................. 375/368; 375/363; 375/366; 386/12; 386/84
[58] Field of Search ........................ 375/364, 365, 375/366, 367, 363, 344, 368; 386/2, 12, 47, 48, 51, 71, 84; 360/40, 51; 369/44.32

[56] References Cited

U.S. PATENT DOCUMENTS

| | | | |
|---|---|---|---|
| 4,809,305 | 2/1989 | Yamaura | 375/363 |
| 4,849,994 | 7/1989 | Heitmann et al. | 375/365 |
| 5,142,421 | 8/1992 | Kahlman et al. | 360/40 |

*Primary Examiner*—Tesfaldet Bocure
*Attorney, Agent, or Firm*—Sughrue, Mion, Zinn, Macpeak & Seas, PLLC

[57] ABSTRACT

An apparatus and method for converting a serial data signal into a parallel data signal based on sync signals contained within the serial data signal are provided. The serial-to-parallel data conversion apparatus includes a signal input end, a true sync signal identifier for individually identifying whether the sync signals contained in the serial data signal are true sync signals having the same positions as those of original sync signals, based on predetermined sync patterns, a false sync signal removal unit for removing from the serial data signal false sync signals which are sync signals that are not identified by the true sync signal identifier as true sync signals, and a clock generator for generating a clock signal for performing serial-to-parallel conversion of the serial data signal by using the sync signals contained in the serial data signal output from the false sync signal removal unit. Accordingly, the disclosed apparatus and method allow serial-to-parallel data conversion to be safely performed in both the case where a sync signal is not detected due to an error in the serial data and where the serial data is incorrectly detected as a sync signal because of an error.

17 Claims, 4 Drawing Sheets

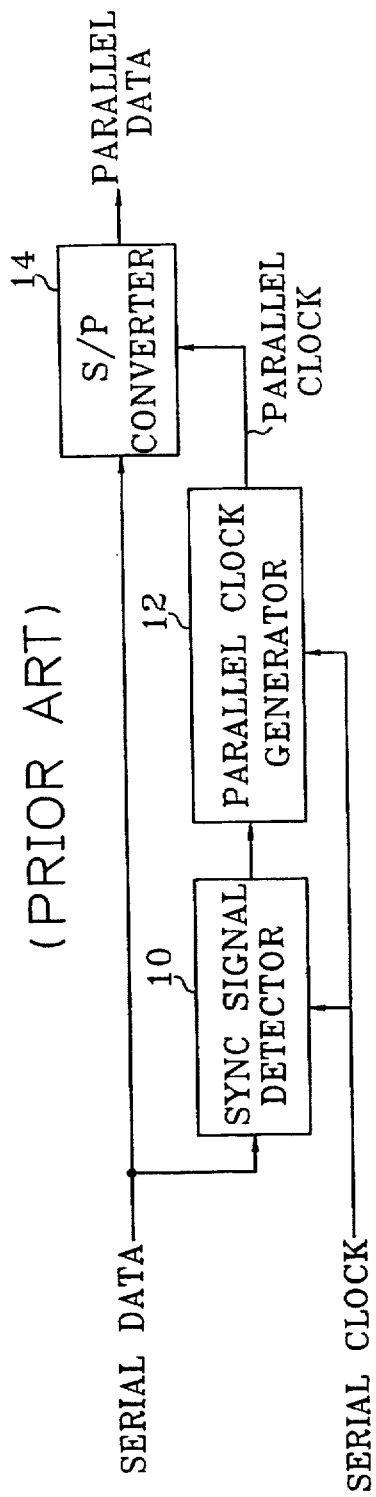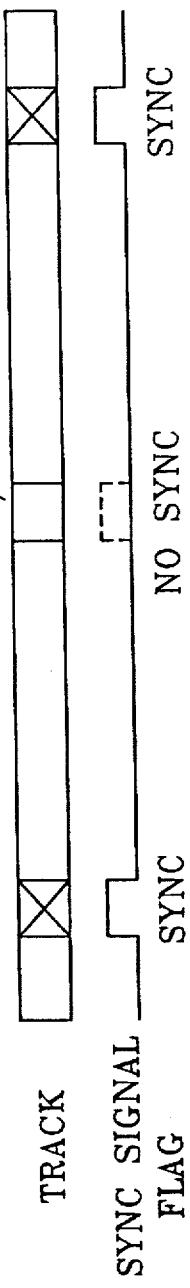

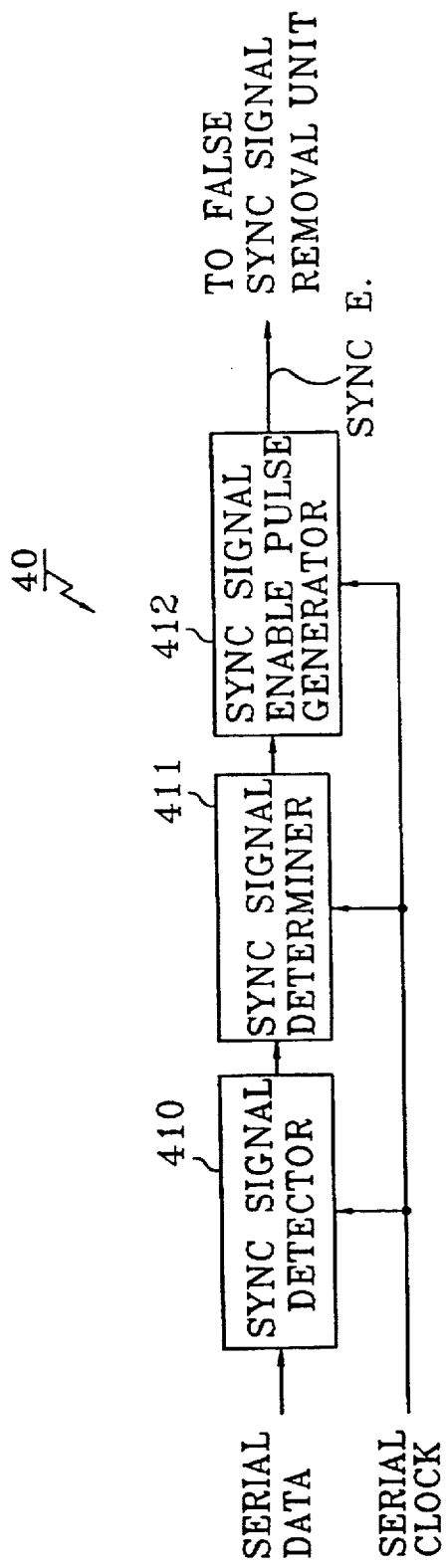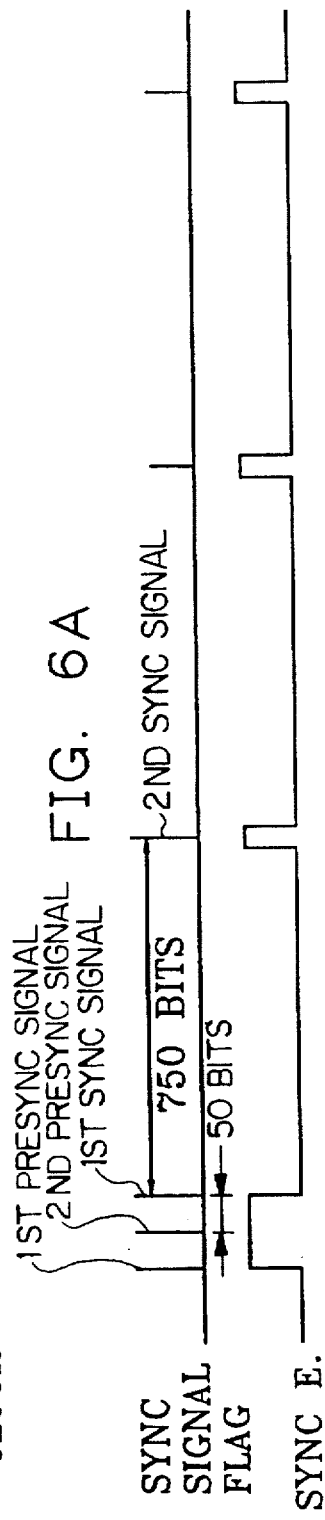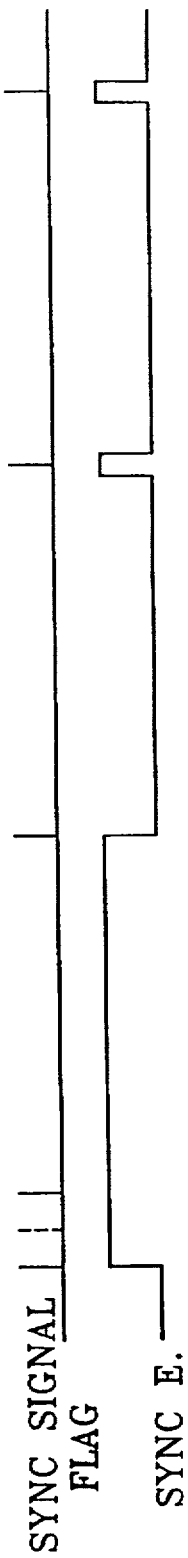

5,796,794

1

METHOD AND APPARATUS FOR SERIAL-TO-PARALLEL CONVERSION OF DATA BASED ON SYNC RECOVERY

BACKGROUND OF THE INVENTION

1. Field of the Invention

The present invention relates to a method for serial-to-parallel (S/P) converting data based on a sync signal, and an apparatus therefor. More particularly, it relates to a method for accurately S/P converting data even when an error occurs in a sync signal for a playback system using a recording medium such as a magnetic tape, a disk and the like, and for a receiver in an aerial wave broadcasting system, and an apparatus therefor.

2. Description of Related Art

Due to developments in semiconductor technology, it is possible to digitally process a video signal having a broad bandwidth as well as digitally process an audio signal. As recording medium and recording process technologies are enhanced, it is possible that a full digital signal processing system will be developed. If an error occurs in a sync signal when such a full digital signal processing system S/P converts a received signal or an information signal read from a recording medium, where the sync signal is received with the received signal or a read sync signal, the received signal or read information signal cannot be accurately S/P converted. An example of inaccurate detection of a sync signal due to an error is described below with respect to a standard digital (SD)-video cassette recorder (VCR).

The SD-VCR standard has been discussed among various manufacturing companies which manufacture home-use digital VCRs, for compatible use of the products. According to the SD-VCR standard, an audio signal and a video signal are modulated and then recorded in the form of a bitstream in an audio sector and a video sector on a track, respectively, by means of a 41.85 MHz serial clock. Prior to recording the video and audio signal on tape, error-correction-coding of the video and audio signals is performed to reduce the occurrence of errors, and channel-modulation is performed. Among various channel modulation methods which have been developed so far, the SD-VCR uses a 24/25 modulation method. The 24/25 modulation inserts an extra bit into three-bytes (24 bits) of parallel data which are output after being error-correction-coded, thereby converting it into 25 bits of parallel data. Here, the inserted bit has a value of "0" or "1" according to a condition. Such a modulation scheme is disclosed in detail in U.S. Pat. No. 5,142,421 entitled "Device For Recording A Digital Information Signal On A Record Carrier."

The 24/25 modulated data is serially converted according to the SD-VCR standard and is recorded on a tape in the form of the bitstream. During playback, the serial data is converted into parallel data, which is called a serial-to-parallel (S/P) conversion. The S/P conversion uses the sync signal contained in the bitstream as a reference. The S/P conversion of the data is performed based on the sync signal detected in the bitstream. Subsequent 25/24 demodulation cannot be accurately performed until such a S/P conversion is accurately performed.

FIG. 1 is a block diagram of a conventional S/P conversion apparatus for a SD-VCR. In FIG. 1, a sync signal detector 10 detects a sync signal from serial data reproduced in the form of a bitstream. A parallel clock generator 12 divides a serial clock by 25 based on each detected sync signal, to produce a parallel clock. A S/P converter 14 converts the serial data into parallel data 25-bits by 25-bits according to the parallel clock which has been obtained by the divide-by-25 operation. The converted parallel data is input to a 25/24 demodulator (not shown) which performs a 25/24 demodulation process on the input data.

An error can occur in the data due to a variety of causes such as a magnetic conversion accompanied by recording the data on the tape and the traveling of the tape. Accordingly, the sync signal can be incorrectly played back due to such a recording error.

FIGS. 2A and 2B are waveform diagrams for explaining different types of sync signal errors which can be produced during the S/P conversion of the data. FIG. 2A shows the case where an abnormal sync signal indicated by an arrow, among regularly arranged sync signals which are indicated by the symbol a, corresponds to a sync signal which should be played back but which is not reproduced. FIG. 2B shows the case where data between the regularly arranged sync signals is abnormal, indicated by an arrow, such that the abnormal data is incorrectly interpreted as a sync signal resulting in a false sync signal being detected between true sync signals.

The above-described sync signal errors severely affect the SD-VCR so that the recorded data is not accurately played back. The conventional apparatus of FIG. 1 suffers from the problem of not being able to correct errors occurring in the sync signals.

SUMMARY OF THE INVENTION

Therefore, to solve the above problems, it is an object of the present invention to provide a method for accurately recovering a sync signal in order to perform serial-to-parallel data conversion in both the case where a sync signal to be played back is not reproduced as a sync signal and the case where data is incorrectly interpreted as a sync signal and is reproduced as a sync signal.

Another object of the present invention is to provide an apparatus adopting the above-described method.

To accomplish the above object of the present invention, there is provided a method for converting a serial data signal into a parallel data signal based on sync signals contained within the serial data signal, the data signal serial-to-parallel conversion method includes the steps of:

(a) detecting the sync signals contained in the serial data signal based on a predetermined sync pattern;

(b) individually determining for each of the sync signals detected in step (a) whether the detected sync signal is a true sync signal having the same position within the serial data signal as one of the sync signals contained in the serial data signal;

(c) removing from said serial data signal a false sync signal, wherein said false sync signal is one of the sync signals detected in step (a) which is not one of the sync signals determined in step (b) to be said true sync signal; and (d) generating a clock signal for performing a serial-to-parallel conversion of the serial data signal by using the sync signals contained in the serial data signal after step (c) is performed.

The other object of the present invention can be accomplished by providing an apparatus for converting a serial data signal into a parallel data signal based on sync signals contained within the serial data signal, the data signal serial-to-parallel conversion apparatus includes:

a signal input end;

true sync signal identification means for individually identifying whether the sync signals contained in the serial data signal applied through said signal input end are true sync signals having the same positions as those of original sync signals, based on predetermined sync patterns;

false sync signal removal means for removing false sync signals from said serial data signal, wherein said false sync signals are sync signals in the serial data signal which are not identified as said true sync signals; and clock generation means for generating a clock signal for performing a serial-to-parallel conversion of the serial data signal using the sync signals contained in the serial data signal output from said false sync signal removal means.

BRIEF DESCRIPTION OF THE DRAWINGS

The preferred embodiments are described with reference to the drawings wherein:

FIG. 1 is a block diagram of a conventional serial-to-parallel data conversion apparatus.

FIGS. 2A and 2B are waveform diagrams for explaining types of sync signal errors which can be produced during the S/P conversion of data.

FIG. 5 is a detailed block diagram of the true sync signal identifier shown in FIGS. 3 and 4.

FIGS. 6A and 6B are waveform diagrams for explaining types of sync signal enable pulses which are output from the true sync signal identifier of FIG. 5.

DETAILED DESCRIPTION OF THE PREFERRED EMBODIMENT

Preferred embodiments of the present invention are described below in more detail with reference to the accompanying drawings.

Prior to explaining the embodiments of the present invention, the SD-VCR standard of the sync signal is described here in more detail.

In each track of a video tape, according to the SD-VCR standard, data is recorded in the following sequence: an insert and track information (ITI) sector, an audio sector, a video sector and a subcode sector. In the audio and video sectors, each sector contains two pre-sync signals having an interval of 50 bits therebetween, and data sync blocks each of which includes 750 bits located at the end of a pre-sync signal. Each data sync block includes a sync signal. That is, each data sync block is formed from 750 bits including a sync signal. Also, an interval between an initial data sync block and the second pre-sync signal in each sector is 50 bits.

The S/P converter of the SD-VCR, in synchronization with the sync signal, converts the serial data into parallel data according to the parallel clock data obtained by the divide-by-25 operation of the serial clock. As a result, a data sync block having 750 bits is converted into 30 sets of parallel data each set consisting of 25 bits. Here, the parallel clock has a frequency of 41.85 MHz.

Figure 3:
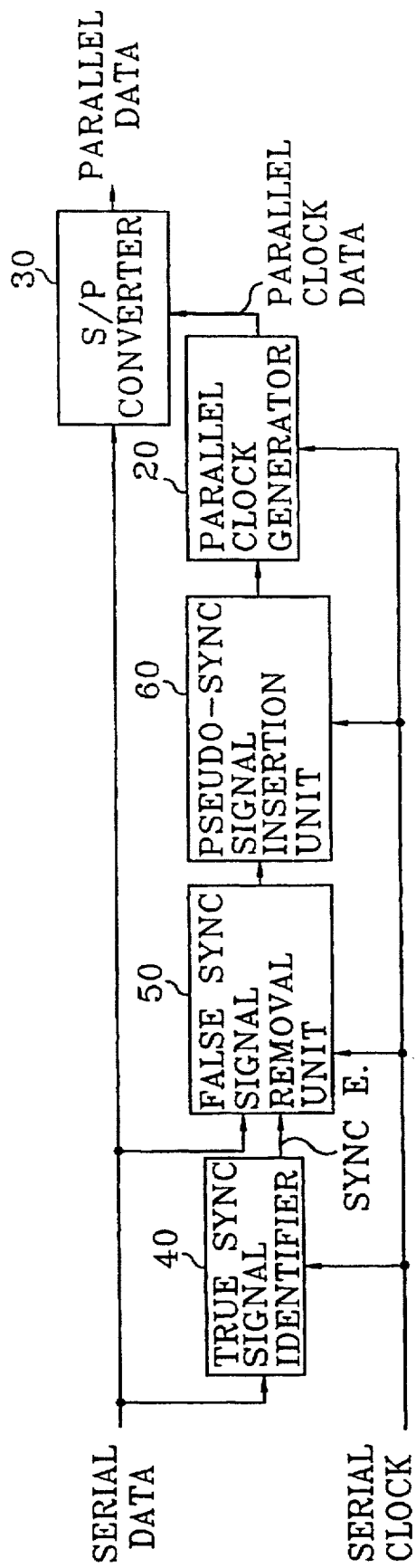
FIG. 3 is a block diagram of a S/P conversion apparatus for a SD-VCR according to a preferred embodiment of the present invention.

FIG. 3 is a block diagram of a S/P conversion apparatus according to a preferred embodiment of the present invention, in which serial data is obtained from a tape (not shown) by a SD-VCR.

A true sync signal identifier 40 receives serial data and a serial clock, and detects a sync signal contained in the serial data. The structure and operation of the true sync signal identifier 40 is described below with reference to FIG. 5. A sync signal detector 410 detects a sync signal based on a data comparison between predetermined sync patterns and sync signals according to the SD-VCR standard. The detected sync signal is applied to a sync signal determiner 411. Sync signal determiner 411 identifies whether or not the detected sync signal is a true sync signal having the same position in the bitstream as that of an original sync signal. For such an identification, sync signal determiner 411 determines at least one sync signal position based on the detected position of the detected sync signal. In the video sector or the audio sector, sync signal determiner 411 determines the position of the next pre-sync signal based on the initially detected pre-sync signal and the SD-VCR standard. If a sync signal is detected in that determined position, sync signal determiner 411 determines that position as a true sync signal position. Sync signal determiner 411 generates a control signal corresponding to the determined position and supplies that control signal to a sync signal enable pulse generator 412. The sync signal enable pulse generator 412 generates a sync signal enable pulse (SYNC E) having a predetermined width, synchronized with the expected positions of the sync signals which are expected to follow in the serial data, based on the determined positions.

In the case of an video or audio sector, a 50 bit interval is maintained between the second pre-sync signal and the data sync block immediately following the second pre-sync signal. A 750 bit interval is maintained between sync signals in the respective data sync blocks. Thus, sync signal enable pulse generator 412 generates a sync signal which is adapted to such a data structure. The width of the sync signal enable pulse is determined according to the amount of data of the sync signals in the SD-VCR standard.

FIGS. 6A and 6B are waveform diagrams for explaining the operation of true sync signal identifier 40 shown in detail in FIG. 3. FIG. 6A shows the case where sync signal determiner 411 identifies two sync signals such as the pre-sync signal (i.e., the first pre-sync signal) and the next pre-sync signal (i.e., the second pre-sync signal) that is within 50 bits of the first pre-sync signal. In this case, the sync signal enable pulse Sync E. is held at a high level during the period between the first pre-sync signal and the first sync signal, and is held at a low level during the period between the first sync signal and a second sync signal. Thereafter, the sync signal enable pulse Sync E., which is a high level pulse having a width of several bits, is repeated after intervals of 750 bits.

FIG. 6B shows the case where sync signal determiner 411 identifies two sync signals in a 750 -bit interval following the sync signals, because the second pre-sync signal for the 50-bit interval is not reproduced well as shown by the dotted-line in FIG. 6B. The sync signal enable pulse Sync E. remains at a high level until the second-sync signal of the 750 -bit interval is detected, and then it goes low upon detection of the second sync signal of the 750 -bit interval. Thereafter, a high-level sync signal enable pulse Sync E., having a width of several bits, is repeated at 750 bit intervals. Thus, the sync signal occurring when the sync signal enable pulse is at the high level, is a true sync signal, and the other sync signals are false sync signals unless the sync signals occur during the 750 -bit interval.

If the sync signal enable pulse generated by the true sync signal identifier 40 is supplied to a false sync signal removal unit 50, then false sync signal removal unit 50, which receives the serial data and the serial clock, outputs the serial data to a pseudo-sync signal insertion unit 60 during the time when the sync signal enable pulse is supplied to false sync signal removal unit 50. False sync signal removal unit 50 operates to remove the false sync signals which have been mistaken as sync signals due to the errors. Pseudo-sync signal insertion unit 60, which receives the serial clock and the data output from false sync signal removal unit 50, inserts a pseudo-sync signal at a position where a sync signal should exist based on the SD-VCR standard, if no sync signal is present at that position.

A parallel clock generator 20 generates a parallel clock obtained by dividing the serial clock by 25, based on a full sync signal obtained after completion of the error-correction of the sync signal discussed above. The S/P converter 30 converts the serial data into parallel data according to the parallel clock generated by parallel clock generator 20. The parallel data output from S/P converter 30 is demodulated by a 25/24 demodulator (not shown).

Figure 4:
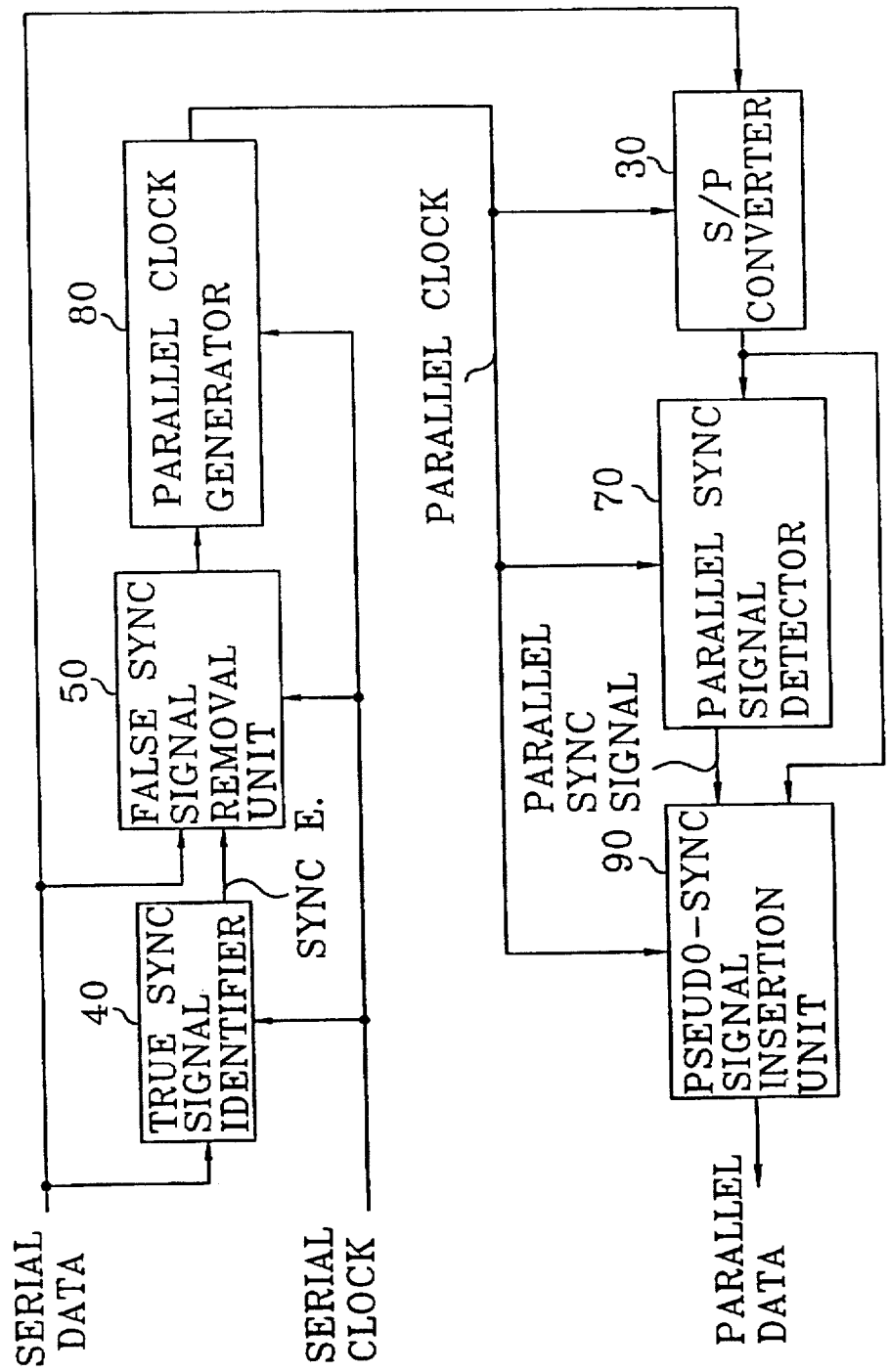
FIG. 4 is a block diagram of a S/P conversion apparatus for a SD-VCR according to another preferred embodiment of the present invention.

FIG. 4 is a block diagram of a S/P conversion apparatus for converting serial data obtained by a SD-VCR from a tape (not shown) according to another preferred embodiment of the present invention. In FIG. 4, since the elements having the same reference numerals as those of FIG. 3 perform the same functions as that of the corresponding blocks of FIG. 3, detailed descriptions thereof are omitted.

A parallel clock generator 80 shown in FIG. 4 generates a parallel clock based on the data output from a false sync signal removal unit 50, that is, true sync signals. The functional difference between the parallel clock generator 80 of FIG. 4 and the parallel clock generator 20 of FIG. 3, resides in the fact that the parallel clock generator 80 generates a parallel clock by using the true sync signals in which there may be sync signals which are not detected due to errors, not by using all the sync signals according to the SD-VCR standard. The parallel clock generator 80 generates a parallel clock which is obtained by dividing the serial clock by 25 based on the true sync signals output from false sync signal removal unit 50. S/P converter 30 converts the serial data into parallel data according to the parallel clock output from parallel clock generator 80. When the data is serial-to-parallel converted according to the parallel clock generated by parallel clock generator 80, a sync signal may not be present in a position predetermined according to the SD-VCR standard. In such a case, a single data sync block may exceed an amount of data predetermined by the SD-VCR standard. Thus, in a video or audio sector, as an example, a sync signal may not be reproduced from a position where the sync signal should be reproduced according to the sync signal input to parallel clock generator 80. That is, there may be an omitted sync signal. In this case, the output data of the S/P converter 30 incorrectly includes sixty sets of 25-bit parallel data for a single parallel sync signal.

To solve this problem a parallel sync signal detector 70 and a pseudo-sync signal insertion unit 90 are used. The parallel sync signal detector 70 detects a parallel sync signal based on a position synchronized with the parallel clock applied from parallel clock generator 80, from among the parallel data output from S/P converter 30. Parallel sync signal detector 70 determines a position at which a sync signal is not detected due to an error, based on the sync signal position of the SD-VCR standard. The parallel sync signal detector 70 also outputs a parallel sync signal which is synchronized with the position where the sync signal is not detected due to an error. Pseudo-sync signal insertion unit 90 inserts the parallel sync signal applied from the parallel sync signal detector 70 into a corresponding position within the parallel data supplied from S/P converter 30. The position of insertion of the parallel sync signal is determined by the parallel clock output from parallel clock generator 80. Thus, the parallel data output from the pseudo-sync signal insertion unit 90 correctly includes thirty sets of 25-bit parallel data for each parallel sync signal, that is, 750 bits corresponding to 30×25 bits.

As described above, in the method and apparatus according to the present invention, the S/P conversion of data can be safely performed in both cases where a sync signal is not detected due to an error and where data is mistakenly detected as a sync signal due to an error. Since a sync signal is inserted at a position where the sync signal is not detected due to an error, a 25/24 demodulation process for the SD-VCR can be correctly performed.

While only certain embodiments of the invention have been specifically described herein, it will be apparent to one of ordinary skill in the art that numerous modifications may be made thereto without departing from the spirit and scope of the invention.

What is claimed is:

1. A method for converting a serial data signal into a parallel data signal based on sync signals contained in the serial data signal, said method comprising the steps of:
   (a) detecting the sync signals contained in the serial data signal based on a predetermined sync pattern;
   (b) individually determining for each of the sync signals detected in step (a) whether the detected sync signal is a true sync signal having the same position within the serial data signal as one of the sync signals contained in the serial data signal;
   (c) removing from said serial data signal a false sync signal, wherein said false sync signal is one of the sync signals detected in step (a) which is not one of the sync signals determined in step (b) to be said true sync signal; and
   (d) generating a clock signal for performing a serial-to-parallel conversion of the serial data signal by using the sync signals contained in the serial data signal after step (c) is performed.

2. The data serial-to-parallel conversion method according to claim 1, wherein said step (b) comprises the steps of:
   (b1) determining at least one sync signal detection position which follows at least one of said sync signals detected in said step (a), on the basis thereof;
   (b2) performing a sync signal detection operation at the sync signal detection position determined in said step (b1); and
   (b3) determining the sync signal detection position determined in step (b1) as a true sync signal position if in step (b2) one of the sync signals is detected in said sync signal detection position.

3. The serial-to-parallel data conversion method according to claim 2, wherein said step (c) removes said false sync signal based on the position of the determined true sync signal.

4. The data serial-to-parallel conversion method according to claim 1, wherein said step (c) further comprises the steps of:
   (c1) determining if a sync signal is present in the serial data signal at a position corresponding to an expected sync signal position based on said true sync signal within the serial data after said false sync signal is removed; and
   (c2) inserting a pseudo-sync signal into said expected sync signal position of the serial data signal if one of the sync signals is not detected at said expected position.

5. The data serial-to-parallel conversion method according to claim 1, wherein said serial data signal is a signal which is recorded and reproduced according to a known digital video cassette recorder rule.

6. An apparatus for converting serial data signal into parallel data signal based on sync signals contained in the serial data signal, said data signal serial-to-parallel conversion apparatus comprising:

a signal input end;

true sync signal identification means for individually identifying whether the sync signals contained in the serial data signal applied through said signal input end are true sync signals having the same positions as those of original sync signals, based on predetermined sync patterns, and outputting a sync enable signal corresponding to the identified sync signals;

false sync signal removal means for removing false sync signals from said serial data signal based on the sync enable signal, wherein said false sync signals are sync signals in the serial data signal which are not identified as said true sync signals; and clock generation means for generating a clock signal for performing a serial-to-parallel conversion of the serial data signal using the sync signals contained in the serial data signal output from said false sync signal removal means.

7. The data serial-to-parallel conversion apparatus according to claim 6, wherein said true sync signal identification means comprises:

a sync signal detector for detecting at least two sync signals contained in the serial data signal based on said sync patterns;

a sync signal determiner for comparing an interval between said at least two sync signals detected in said sync signal detector with a predetermined interval, and determining whether said at least two sync signals are true signals based on a result of the comparison; and a pulse signal generator for generating an enable pulse signal having a constant width at every position in the serial data signal where an original sync signal is located based on one of the determined true sync signal positions.

8. The data serial-to-parallel conversion apparatus according to claim 7, wherein said false sync signal removal means outputs the serial data signal applied via said serial data signal input end when said enable pulse signal is applied from said pulse signal generator.

9. The data serial-to-parallel conversion apparatus according to claim 6, wherein said false sync signal removal means removes the false sync signal based on the positions of said identified true sync signals.

10. The data serial-to-parallel conversion apparatus according to claim 6, further comprising pseudo-sync signal insertion means for determining if one of the sync signals is present at an expected sync signal position of the serial data signal based on the true sync signals within the serial data signal output from said false sync signal removal means and inserting a pseudo-sync signal into the serial data signal at a position of said expected sync signal if it is determined that no sync signal is present at the expected sync signal position, and supplying the serial data into which the pseudo-sync signal is inserted to said clock generation means.

11. An apparatus for converting serial data signal into parallel data signal in a standard digital video cassette recorder (SD-VCR), said data signal serial-to-parallel conversion apparatus comprising:

an input end for receiving a serial data signal containing sync signals;

true sync signal identification means for individually identifying whether the sync signals contained in the serial data signal applied through said signal input end are true sync signals having the same positions as those of original sync signals in the serial data signal, on the basis of predetermined sync patterns;

false sync signal removal means for removing from said serial data signal, false sync signals which are not identified by said true sync signal identification means as said true sync signals; and clock generation means for generating a clock signal for performing a serial-to-parallel conversion of the serial data signal using the sync signals contained in the serial data signal output from said false sync signal removal means.

12. The data serial-to-parallel conversion apparatus according to claim 11, wherein said true sync signal identification means comprises:

a sync signal detector for detecting at least two sync signals contained in the serial data signal based on said predetermined sync patterns;

a sync signal determiner for comparing an interval between said at least two sync signals detected by said sync signal detector with a predetermined interval, and determining whether said at least two sync signals are true signals based on a result of the comparison; and a pulse signal generator for generating and outputting an enable pulse signal having a constant width for every position in the serial data signal where an original sync signal is detected at a location based on the determined true sync signal position.

13. The data serial-to-parallel conversion apparatus according to claim 12, wherein said detected at least two sync signals are pre-sync signals in the video sector according to the SD-VCR standard.

14. The data serial-to-parallel conversion apparatus according to claim 12, wherein said detected at least two sync signals are pre-sync signals in the audio sector according to the SD-VCR standard.

15. The data serial-to-parallel conversion apparatus according to claim 12, wherein said false sync signal removal means outputs the serial data signal applied through said serial data signal input end during a time when the enable pulse signal is output from said pulse signal generator.

16. The data serial-to-parallel conversion apparatus according to claim 11, further comprising pseudo-sync signal insertion means for determining the location of a missing sync signal, wherein said location of said missing sync signal corresponds to an expected location of one of said true sync signals wherein said expected location is determined based on said true sync signals within the serial data signal output from said false sync signal removal means, and inserting a pseudo-sync signal into the serial data signal at the determined location of said missing sync signal, and supplying the serial data into which the pseudo-sync signal has been inserted to said clock generation means.

17. The data serial-to-parallel conversion apparatus according to claim 11, further comprising:

a serial-to-parallel converter for converting the serial data signal applied via said input end into the parallel data signal according to said clock signal generated by said clock generation means;

a sync signal detector for detecting true sync signals from the parallel data signal output from said serial-to-parallel converter; and pseudo-sync signal insertion means for inserting a pseudo-sync signal into the parallel data signal at a position of a missing sync signal corresponding to an expected one of the true sync signals which is not detected due to the error in the serial data signal, wherein said position of said missing sync signal is detected based on the true sync signals within the serial data signal output from said false sync signal removal means, and outputting the parallel data into which the pseudo-sync signal has been inserted.

* * * * *